Patented July 31, 1945

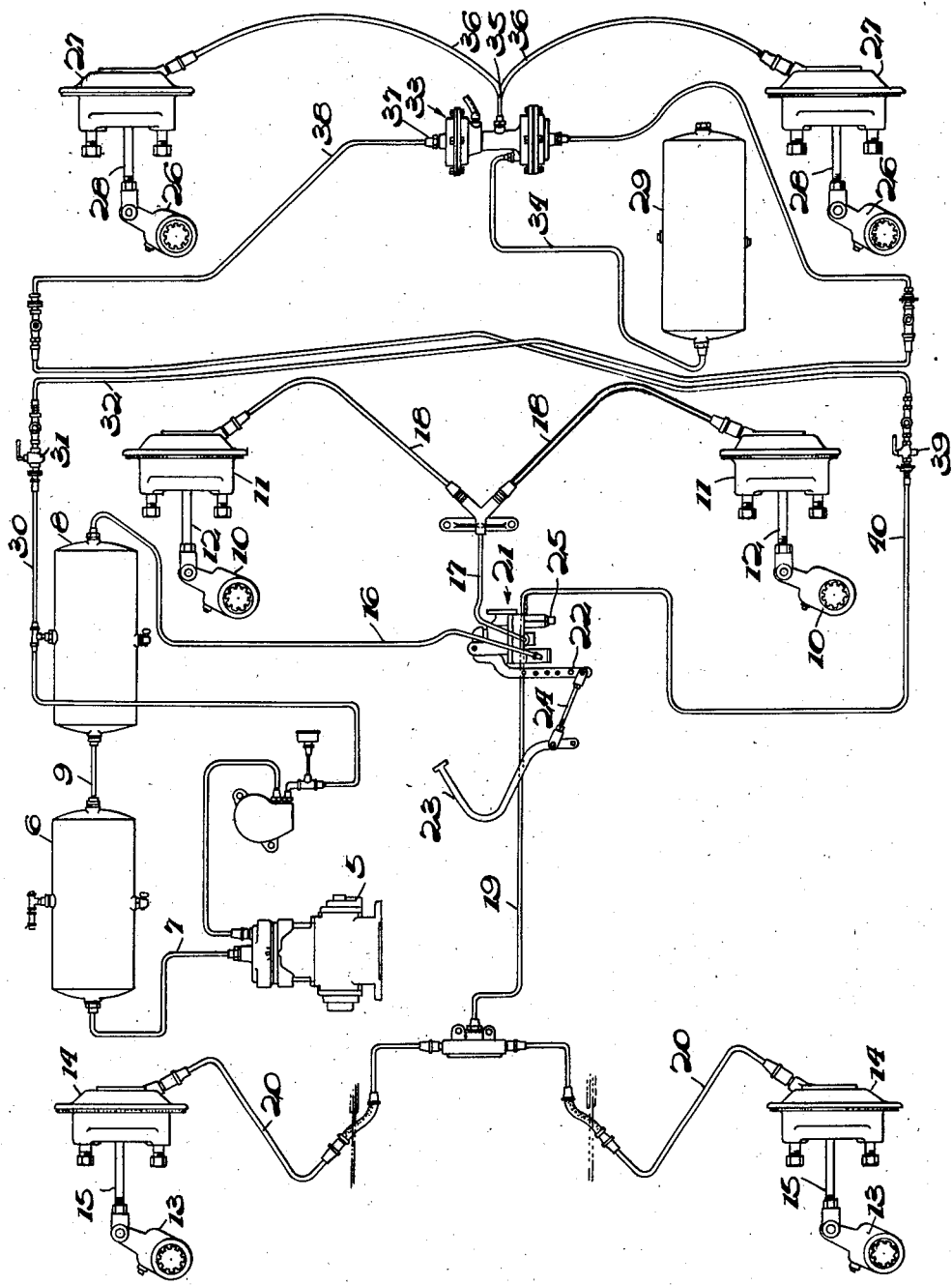

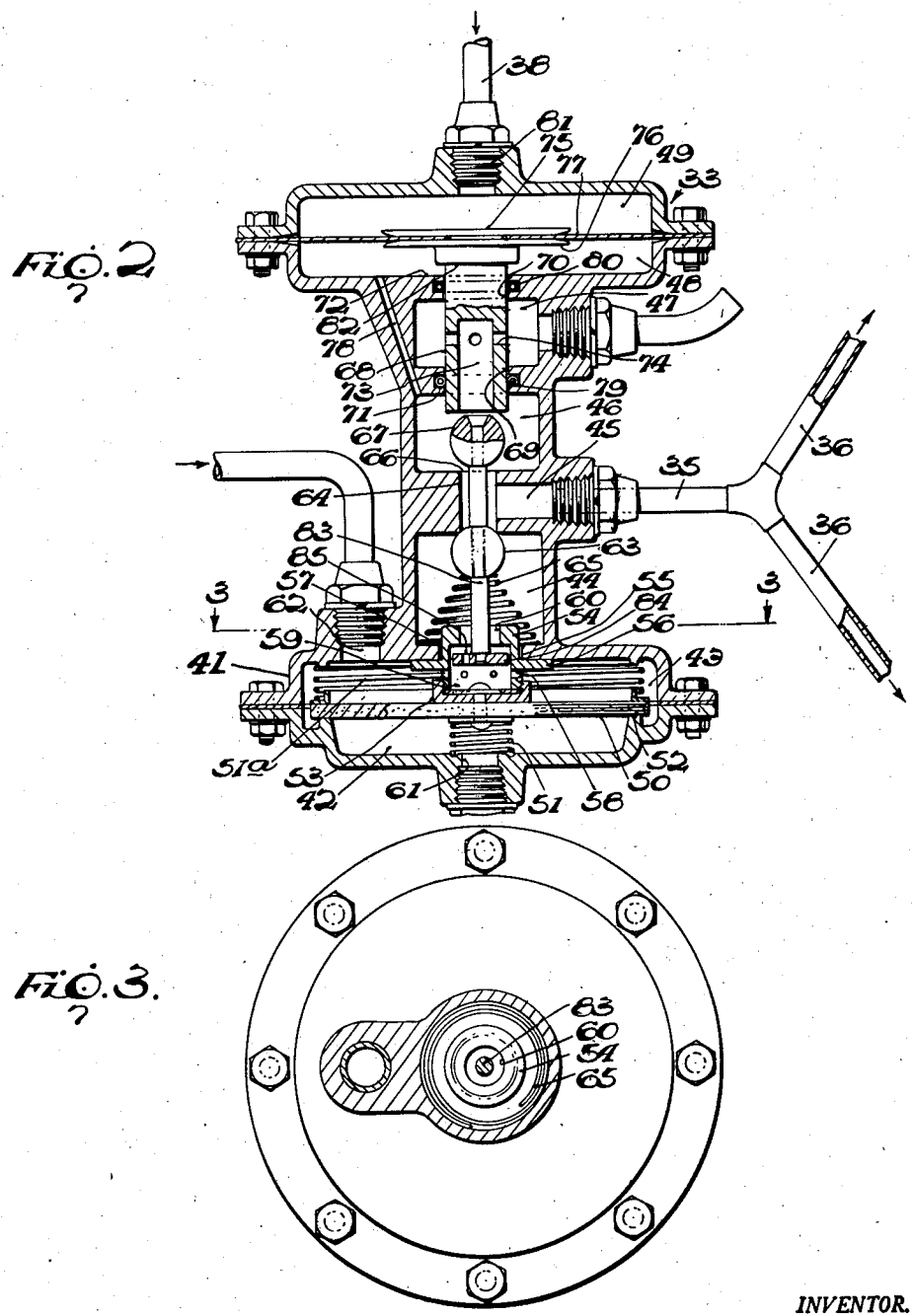

2,380,507

UNITED STATES PATENT OFFICE 2,380,507

FLUID PRESSURE CONTROL MECHANISM

Wilfred A. Eaton, Elyria, Ohio, assignor to Bendix-Westinghouse Automotive Air Brake Company, Elyria, Ohio, a corporation of Delaware Application June 14, 1943, Serial No. 490,814

15 Claims. (Cl. 303—26)

This invention relates in general to air brake systems and in particular to control valves for trailer brake equipment.

It has previously been proposed to provide combined relay and emergency valves for normally placing the control of the trailer brakes under the control of the operator, and for automatically applying the trailer brakes in the event of failure of the air supply, but most of the mechanisms proposed have required the use of separate valves for obtaining these two desirable forms of control, and in cases where the same valves have been utilized to obtain both types of control, the mechanism required to render the automatic emergency control effective has interfered with the normal operation of the valves to control the brakes under the control of the vehicle operator, and it is accordingly one of the objects of the present invention to overcome these difficulties.

A further object of the invention is to provide a combined relay and emergency valve having intake and exhaust valves, so constituted as to permit the intake and exhaust valves to be controlled directly by the operator, or by variations of pressure in the fluid pressure supply.

Yet another object of the invention is to provide a control valve having intake and exhaust valves adapted for control either by the operator or by variations of pressure in the fluid pressure supply line, so constituted as to permit unimpeded operation of the valves by either agency without interference with the operation thereof by the other agency.

It has also been found desirable, in connection with valves of this type to provide a substantially unrestricted flow of fluid to the brake actuators during operation under the control of the operator, and a restricted flow of fluid during emergency operation of the valve mechanism, and it is accordingly another object of the invention to provide, in a control valve of the above type, means for accomplishing this desirable end.

A still further object of the invention is to provide a combined relay and emergency valve of the above type, so constituted as to permit utilization of the valve as a relay valve only, by a simple elimination of the parts contributing to the emergency valve operation, without the necessity of making other changes in the valve structure.

These and other desirable objects and features of the invention will be more readily apparent to those skilled in the art when considered in the light of the following description, but it is to be expressly understood that the description is not to be taken as limiting the invention, reference being had for this purpose to the appended claims.

In the drawings, wherein similar reference characters are utilized in the several views, Fig. 1 is a diagrammatic illustration of a fluid pressure brake system for a tractor-trailer vehicle embodying the present invention:

Fig. 2 is a sectional view of the combined relay and emergency valve, and

Fig. 3 is a sectional view taken along line 3—3 of Fig. 2.

With particular reference to Fig. 1, the relay-emergency valve is illustrated in connection with a tractor-trailer brake system of conventional type having a compressor 5 suitably driven by the vehicle engine, not shown, and adapted to supply fluid pressure to a reservoir 6 through the medium of a conduit 7, the reservoir 6 in turn being connected with a second reservoir 8 through a conduit 9, both of the above reservoirs normally being mounted on the tractor. The tractor is further provided with rear brake operating levers 10 actuated by rear brake actuators 11 through connecting rods 12, and front brake levers 13 operated by front brake actuators 14 through connecting rods 15 as shown. In order that the tractor brakes may be properly controlled by the operator, the reservoir 8 is connected with the brake actuators by means of a conduit 16 and conduits 17 and 18, and with the front brake actuators through conduit 16 and conduits 19 and 20, the flow of fluid pressure between the conduit 16 and conduits 17 and 19 being controlled by means of a self-lapping control valve 21, preferably constructed in accordance with the principle set forth in the patent to Wilfred A. Eaton, No. 2,204,530 dated June 11, 1940. This valve is provided with an operating lever 22 connected to an operator's control pedal 23 by means of a connecting rod 24, and provided with an exhaust outlet 25, as shown. It will be understood on reference to the above patent, that with the lever 22 in the position shown, the valve serves to establish a connection between the exhaust port 25 and conduits 17 and 19, while on movement of the lever in a clockwise direction or operation of the brake pedal, the valve serves to prevent communication between the above conduits and to establish communication between conduit 16 and conduits 17 and 19 to supply fluid pressure to the brake actuators 11 and 14 at a pressure substantially proportional to the degree of movement of the brake pedal 23.

A trailer vehicle, not shown, is likewise provided with brake operating levers 26 adapted for operation by brake actuators 27 connected thereto by means of connecting rods 28, the trailer vehicle also being provided with an emergency reservoir 29. In order that fluid pressure may be available in reservoir 29 to operate the trailer brakes, the reservoir 8 on the tractor is connected to the trailer reservoir through the medium of a conduit 30, a shut-off valve 31, a conduit 32, a relay-emergency valve 33, and a conduit 34, the valve 31 being normally open, and the valve 33 serving, as will be more fully described hereinafter, to normally permit the flow of fluid pressure from the conduit 32 to the conduit 34 and thence to the trailer reservoir. In addition to the foregoing, the relay-emergency valve 33 serves to control communication between the trailer reservoir and the brake actuators 27 by virtue of its connection therewith through a conduit 35 and conduits 36 connected thereto, as will be more fully explained hereinafter, and in order that the operation of the relay-emergency valve may be under the control of the operator, the upper portion of the valve is provided with a connection 37 adapted to receive fluid pressure from the brake valve 21 through conduit 38, shut-off valve 39 and conduit 40.

In order that the operation of the above system may be more fully understood, reference is had to Fig. 2 of the drawings illustrating the construction of the valve 33 in more detail. The valve is provided with a casing 41 having a supply chamber 42, a chamber 43 suitably connected with the trailer reservoir 29, an inlet chamber 44, an outlet chamber 45, a pair of exhaust chambers 46 and 47, a diaphragm chamber 48 and a control chamber 49 as shown. The supply chamber is separated from the chamber connected with the trailer reservoir by means of a flexible diaphragm 50, the diaphragm normally being maintained in the position shown by means of a spring 51 interposed between the casing and the lower central portion of the diaphragm and a spring 51a interposed between the casing and the outer periphery of the upper surface of the diaphragm which serves to normally maintain the lower surface of the diaphragm in engagement with an annular valve seat 52 formed in the casing, the diaphragm thus serving as a check valve to permit communication between chamber 42 and chamber 43, and to prevent communication between the chambers in the other direction. The central portion of the diaphragm is provided with a nut 53 adapted to threadedly receive a member 54 slidably mounted in a bore 55 formed in the casing between chambers 43 and 44, and provided with a flanged portion 56 adapted to engage the lower surface of a partition 57 formed between the chambers in order to prevent further upward movement of the member under the action of the spring 51. Communication is normally maintained between chambers 43 and 44 through the above member through ports 58 formed in the wall thereof, a chamber 59 formed in the member and a port 60 connecting the chamber with the chamber 44. The chamber 42 is provided with a supply port 61 connected with conduit 32, while the chamber 43 is provided with a port 62 connected with the trailer reservoir through conduit 34, the lower surface of the diaphragm thus being subjected at all times to the pressure in the conduit 32, and the upper surface of the diaphragm being subjected to the pressure in the conduit 34.

The inlet chamber 44 of the valve is thus subjected to the pressure in the trailer reservoir 29 through the means described, and in order to control the supply of fluid pressure from the trailer reservoir to the trailer brake actuators, an inlet valve 63 is provided, this valve being normally maintained in engagement with the lower end of a circular port 64 connecting chambers 44 and 46 by means of a spring 65 interposed between the lower side of the valve and the upper surface of the partition 57. The valve is provided with an upwardly extending stem 66, and an exhaust valve 67 is carried by the upper end thereof in normally spaced relation with the upper end of the port 64, the port 64 being connected as shown with the outlet chamber 45. Operation of the above valve is controlled by means of a valve operating element 68 slidably mounted in bores 69 and 70 centrally located in partitions 71 and 72 which serve respectively to separate chamber 46 from chamber 47 and chamber 47 from chamber 48, the central portion of the element being provided with an exhaust port 73 open at its lower end and connected with the chamber 47 through ports 74. Thus the exhaust ports 73 and 64 are serially connected by the exhaust chamber 46 when the exhaust valve 63 is in the position shown. The upper end of the valve operating element is suitably connected by means of flanged portions 75 and 76 with a flexible diaphragm 77, carried by the casing as shown and serving to separate chambers 48 and 49, it being noted that chamber 48 is connected with the exhaust chamber 46 through the medium of a restricted passage 78. Leakage between the chambers 46 and 47 and chambers 47 and 48 is prevented by means of suitable sealing elements 79 and 80 located respectively in the bores 69 and 70.

In order that the above described mechanism may serve to control the pressure of fluid in the trailer brake actuators, the outlet chamber 45 is connected with the actuators through conduits 35 and 36, while the control chamber 49 is connected with the outlet of the trailer brake valve 21 through a port 81 connected with the conduit 38. Thus on operation of the brake valve to supply fluid pressure to the tractor brake chambers, the same degree of fluid pressure is likewise supplied to the chamber 49 through conduit 40, shut-off valve 39 and conduit 38, with the result that the diaphragm 77 forces the valve operating element 68 downward, whereupon the lower end of the exhaust port 73 engages the upper end of the exhaust valve 67 to prevent communication between the exhaust chamber 46 and the exhaust chamber 47 through the exhaust port 73 and the ports 74, and acts on further downward movement to open the valve 63 and permit communication between the inlet chamber 44 and the outlet chamber 45 through the bore 64. In order to provide self-lapping action of the valve, a stop 82 is provided at the upper end of valve operating element 68, serving on downward movement of the element to contact the upper face of the partition 72 and to limit the movement of the exhaust valve in order to prevent closing of the upper end of the bore 64 thereby, it thus being apparent that the chamber 48 is at all times subjected to the pressure in the outlet chamber 45 through the bore 64, the chamber 46 and the restricted passage 78. Thus on operation of the intake valve, the pressure in the outlet chamber, and consequently in the chambers 46 and 48, will increase until it reaches a value slightly in excess of that in the control chamber 49, at which time the excess pressure in chamber 48 will actuate the diaphragm to move the valve operating element 68 upward to permit closing of the intake valve under the action of the intake valve spring 65, any further increase in pressure in the above chambers, due to possible leakage of the intake valve, serving to still further move the diaphragm and valve operating element to open the exhaust valve and permit the escape of excess fluid pressure. It will be seen from the foregoing that the pressure supplied to the trailer brake actuators will therefore be under the control of the operator and that this pressure will be substantially the same at all times as that delivered by the brake valve to the actuators on the tractor, this action being already well-known to those skilled in the art in connection with control valves of this general type.

It is also desirable, however, to provide for an automatic operation of the trailer brakes in the event of failure of the air supply to the trailer reservoir, and in order that this desirable end may be accomplished, the intake valve is provided with a downwardly extending stem 83 provided at its lower end with a flanged portion 84 positioned in the chamber 59 and having a greater diameter than the bore 60. As shown in the drawings, the flanged portion is free to move downward without contact with the member 54, and it will be further seen that the flanged portion is of sufficiently smaller diameter than the interior of the chamber 59 to permit the free passage of fluid from the chamber 59 to the inlet chamber 44, the flow of fluid between the trailer reservoir and the inlet chamber thus being substantially unimpeded during control of the valves by the relay diaphragm 77, and operation of the intake and exhaust valve assembly likewise being unimpeded by any mechanical interference with the member 54. In the event of failure of the pressure in the supply line leading to the chamber 42 and in the chamber 42, it will be understood that the pressure in the trailer reservoir, acting on the upper face of the diaphragm 50, will immediately serve to move the diaphragm downward, thus causing the member 54 to engage the upper surface of the flanged portion 84 to move the intake valve downward to fully open position, and at the same time, to move the exhaust valve 67 downward to close the upper end of the bore 64, thus establishing a direct connection between the reservoir 29 and the brake actuators 27 through conduit 34, chamber 43, ports 58, chamber 59, a restricted port 85 formed in the flanged portion 84 and in register with the port 60, inlet chamber 44, port 64, outlet chamber 45, conduit 35 and conduits 36.

In connection with the operation of emergency valves of this type, it has previously been found that when the connection between the trailer reservoir and the inlet chamber was relatively unrestricted, there was a tendency on initial operation of the inlet valve 63 toward open position for the pressure in the chamber above the diaphragm to be rapidly depleted through the exhaust port prior to closing of the exhaust valve, particularly in cases where the pressure in the supply chamber was gradually dropped to a pressure less than that in the chamber above the diaphragm due to leakage in the supply line, with the result that rapid reciprocation of the inlet valve occurred between closed and open position with resultant depletion of the fluid pressure supply in the entire system. It was subsequently found that by restricting the supply of fluid to the inlet chamber under such conditions, this undesirable action could be substantially avoided, and this is accomplished in the present instance by the action of the restricted passage 85 formed in the flanged member 84, the action being such that on downward movement of the member 54, the upper end of the chamber 59 contacts the upper surface of the member 84 and prevents communication between chamber 59 and chamber 44 except through the restricted port 85 and the port 60, it being noted that the member 54 is slidably mounted in the bore 84 in order to prevent appreciable leakage between the chambers 43 and 44 at this point. It is undesirable however, to have this restricted operation when the valve is operated as a relay valve under the control of the operator, and the upper surface of the member 84 is accordingly normally separated from the upper end of chamber 59 in order to render the restricted port 85 ineffective and to permit substantially unrestricted communication between chambers 43 and 44.

In the event it is desired to utilize the valve as a relay valve only, the emergency feature may be readily dispensed with by eliminating the diaphragm 50 and the parts associated therewith, either of the ports 61 or 62 being connected with the source of fluid pressure in this event and the other port being closed by means of a suitable plug. There has thus been provided by the present invention, a combined relay and emergency structure wherein the same inlet and exhaust valves are utilized to control the operation of the brakes during normal and emergency operation, and wherein the supply of fluid pressure to the inlet chamber of the valve is substantially unrestricted during normal operation, and is restricted during emergency operation in order to prevent undesirable reciprocation of the valve and consequently depletion of the fluid in the system, the parts for performing the emergency operation of the valve being so arranged as to prevent any interference whatsoever with the operation of the valve mechanism when utilized as a relay valve, this being accomplished by means of the lost motion connection between the stem of the intake valve and the emergency diaphragm.

While one embodiment of the invention has been illustrated and described with considerable particularity, it is to be expressly understood that the same is not limited to the form shown, but may receive a variety of mechanical expressions, as will readily appear to those skilled in the art. Reference will, therefore, be had to the appended claims for a definition of the limits of the invention.

What is claimed is:

1. Control valve mechanism for a fluid pressure brake system including a casing, a valve assembly movably mounted therein and provided with intake and exhaust valves, a pair of serially connected exhaust ports, a pressure responsive member operable for moving said valve assembly to close one of the exhaust ports and open the intake valve, and a second pressure responsive member for moving the valve assembly to close the other exhaust port and open the intake valve.

2. Control valve mechanism for a fluid pressure brake system including a casing having a supply chamber, an inlet chamber, an outlet chamber, a pair of serially connected exhaust chambers, and a control chamber, an intake valve for controlling communication between said inlet and outlet chambers, an exhaust valve for controlling communication between said serially connected exhaust chambers and between said outlet chamber and one of said exhaust chambers, means responsive to the pressure in said control chamber for operating said valves to prevent communication between the exhaust chambers and to establish communication between the inlet and outlet chambers, and means responsive to the pressures in the supply and inlet chambers for operating the valves to prevent communication between the outlet chamber and said one exhaust chamber and to establish communication between the inlet and outlet chambers.

3. Control valve mechanism for a fluid pressure brake system including a casing having a supply chamber, an inlet chamber, an outlet chamber, a pair of serially connected exhaust chambers and a control chamber, an intake valve for controlling communication between said inlet and outlet chambers, an exhaust valve for controlling communication between said exhaust chambers, means responsive to the pressures in said outlet chamber and control chamber for operating said valves to prevent communication between said serially connected exhaust chambers and to establish communication between said inlet and outlet chambers, and means responsive to the pressures in said supply and inlet chambers for operating the valves to prevent communication between the outlet chamber and one of said exhaust chambers and to establish communication between said inlet and outlet chambers.

4. Control valve mechanism for a fluid pressure brake system including a casing having a supply chamber, an inlet chamber, an outlet chamber, an exhaust port, an exhaust chamber having a connection with the outlet chamber, and a control chamber, an inlet valve for controlling communication between the inlet and outlet chambers, an exhaust valve for controlling communication between the exhaust chamber and exhaust port, means subjected to the pressure in said control chamber for operating the valves to prevent communication between the exhaust chamber and exhaust port and to establish communication between the inlet and outlet chambers, and means subjected to the pressure in the inlet chamber for operating said valves to prevent communication between said outlet chamber and exhaust chamber and to establish communication between said inlet and outlet chambers.

5. Control valve mechanism for a fluid pressure brake system including a casing having a supply chamber, an inlet chamber, an outlet chamber, an exhaust port, an exhaust chamber having a connection with the outlet chamber, and a control chamber, a pair of valves for controlling communication between said exhaust chamber and exhaust port, between said inlet and outlet chambers, and between the outlet and exhaust chambers, and a pair of pressure responsive members subjected respectively to the pressures in said outlet and control chambers and to the pressures in said supply and inlet chambers for controlling the operation of said valves.

6. Control valve mechanism for a fluid pressure brake system including a casing having a supply chamber, an inlet chamber, an outlet chamber, an exhaust port, and a control chamber, a pair of valves for controlling communication between said outlet chamber and exhaust port and between said inlet chamber and outlet chambers, a pair of pressure responsive members subjected respectively to the pressures in said outlet and control chambers and to the pressures in said supply and inlet chambers for operating the valves to prevent communication between said outlet chamber and exhaust port and to establish communication between said inlet and outlet chambers, and means operable when the valves are operated by one of said members to establish communication between the inlet and outlet chambers for restricting the flow of fluid between said chambers.

7. Control valve mechanism for a fluid pressure brake system including a casing having a supply chamber, an inlet chamber, an outlet chamber, an exhaust port, an exhaust chamber having a connection with the outlet chamber, and a control chamber, valve means for controlling communication between said exhaust chamber and exhaust port, between said inlet and outlet chambers, and between said outlet and exhaust chambers, a pressure responsive member subjected to the pressures in the outlet and control chambers for operating said valve means to control communication between said inlet and outlet chambers and said exhaust chamber and port, a pressure responsive member subjected to the pressure in said supply and inlet chambers for operating the valve means to control communication between said inlet and outlet and outlet and exhaust chambers, and means including a lost motion connection between said valve means and second named pressure responsive member for preventing operation of the second member by the first member.

8. Control valve mechanism for a fluid pressure brake system including a casing having a supply chamber, an inlet chamber, an outlet chamber, an exhaust port, and a control chamber, valve means for controlling communication between said outlet chamber and exhaust port and between said inlet and outlet chambers, a pressure responsive member subjected to the pressures in said outlet and control chambers for operating said valve means, a pressure responsive member subjected to the pressures in said supply and inlet chambers for operating said valve means, a lost motion connection between said second named member and valve means, and means for restricting communication between said supply and outlet chambers when the valve means is operated by said second named member to establish communication between said inlet and outlet chambers.

9. Control valve mechanism for a fluid pressure brake system including a casing having a supply chamber, an inlet chamber, an outlet chamber, an exhaust chamber connected with the outlet chamber, and an exhaust port, inlet and exhaust valves for controlling communication between said exhaust chamber and exhaust port, between said inlet and outlet chambers, and between said outlet and exhaust chambers, means including a member subjected to the pressure in the outlet chamber for normally controlling the operation of the valves to control communication between said inlet and outlet chambers and between said exhaust chamber and port, and a second member subjected to the pressures in said supply and inlet chambers for independently controlling the operation of said valves to control communication between said inlet and outlet and outlet and exhaust chambers.

10. Control valve mechanism for a fluid pressure brake system including a casing having a supply chamber, an inlet chamber, an outlet chamber, a pair of serially connected exhaust chambers, and a control chamber, intake and exhaust valves mounted for movement in said casing, means including a member subjected to the pressure in the outlet chamber for moving said valves to prevent communication between said outlet chamber and one of said exhaust chambers through the other exhaust chamber and to establish communication between said inlet and outlet chambers, means including a flexible diaphragm subjected to the pressures in said supply and inlet chambers operable when the pressure is said supply chamber exceeds that in the inlet chamber to permit fluid pressure to flow from the supply chamber to the inlet chamber and operable when the pressure in the inlet chamber exceeds that in the supply chamber to prevent the flow of fluid pressure between said chambers and to operate said valves to prevent communication between said outlet chamber and said other exhaust chamber and to establish communication between said inlet and outlet chambers, and means including a lost motion connection between said second named member and valves for permitting operation of the valves by the first named member independently of the second named member.

11. The combination in a fluid pressure brake system having a main reservoir, an auxiliary reservoir, a fluid pressure brake actuator, and a fluid pressure operated relay valve having an intake and an exhaust valve for controlling the flow of fluid pressure from the auxiliary reservoir to the actuator, of operator controlled means including a brake valve having a connection with the main reservoir for supplying fluid pressure to the relay valve and controlling the operation of said intake and exhaust valves through a predetermined range of movement, and means for controlling the operation of said intake and exhaust valves through a greater range of movement independently of the operation of said operator means including a pressure responsive member subjected to the pressure in said main reservoir and to the pressure in said auxiliary reservoir.

12. The combination in a fluid pressure brake system having a main reservoir, an auxiliary reservoir, a fluid pressure brake actuator, and a fluid pressure operated relay valve having an intake and an exhaust valve for controlling the flow of fluid pressure from said auxiliary reservoir to the actuator, of operator controlled means including a brake valve having a connection with the main reservoir for supplying fluid pressure to the relay valve and controlling the operation of said intake and exhaust valves through a predetermined range of movement, means for controlling the operation of the intake and exhaust valves through a greater range of movement independently of the operation of said operator controlled valve including a pressure responsive member subjected to the pressure in said main reservoir and to the pressure in said auxiliary reservoir, and means including a lost motion connection between said pressure responsive member and valves for preventing movement of the pressure responsive member by the operation of the first named means.

13. The combination in a fluid pressure brake system having a main reservoir, an auxiliary reservoir, a fluid pressure brake actuator, and a fluid pressure operated relay valve having an intake valve and an exhaust valve for controlling the flow of fluid pressure from the auxiliary reservoir to the actuator, of operator controlled means including a brake valve having a connection with the main reservoir for supplying fluid pressure to the relay valve and controlling the operation of said intake and exhaust valves, and means for controlling the operation of said intake and exhaust valves independently of the operation of said operator controlled means to supply fluid pressure to said actuator at a restricted rate including a pressure responsive member subjected to the pressure in said main reservoir and to the pressure in said auxiliary reservoir and means operated thereby for restricting the flow of fluid pressure from said auxiliary reservoir to said actuator when the valves are operated by said member to supply fluid pressure from said auxiliary reservoir to said actuator.

14. The combination in a fluid pressure brake system having a main reservoir, an auxiliary reservoir, a fluid pressure brake actuator, and a fluid pressure operated relay valve having an intake valve and an exhaust valve for controlling the flow of fluid pressure from the auxiliary reservoir to the actuator, of operator controlled means including a brake valve having a connection with the main reservoir for supplying fluid pressure to the relay valve and operating the intake and exhaust valves to supply fluid pressure to said actuator, and means for operating said valves independently of the first named means for supplying fluid pressure to the actuator at a restricted rate including a pressure responsive member subjected to the pressure in the main reservoir and to the pressure in the auxiliary reservoir and means including a lost motion connection for connecting said member and valves.

15. The combination in a fluid pressure brake system having a main reservoir, an auxiliary reservoir, a fluid pressure brake actuator, and a fluid pressure operated relay valve mechanism including a valve for controlling the flow of fluid pressure from the auxiliary reservoir to the brake actuator, of operator controlled means including a brake valve having a connection with the main reservoir for supplying fluid pressure to the relay valve mechanism to operate the valve to establish relatively unrestricted communication between the auxiliary reservoir and actuator, and means for operating the valve independently of the operation of the first named means for establishing relatively restricted communication between the auxiliary reservoir and actuator including a member subjected to the pressures in both reservoirs and means for connecting said member and valve.

WILFRED A. EATON.